(12) United States Patent
Waesche et al.

(10) Patent No.: US 7,596,934 B2
(45) Date of Patent: Oct. 6, 2009

(54) LAWN MOWER WITH BELT DRIVE SYSTEM

(75) Inventors: Luke B. Waesche, Hagerstown, MD (US); Edward R. Wright, Dickerson, MD (US); William R. Wright, Clarksburg, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 0 days.

(21) Appl. No.: 11/502,629

(22) Filed: Aug. 11, 2006

(65) Prior Publication Data

US 2008/0034721 A1 Feb. 14, 2008

(51) Int. Cl.
*A01D 69/00* (2006.01)
*A01D 34/00* (2006.01)

(52) U.S. Cl. ........................................ 56/11.9; 56/10.7

(58) Field of Classification Search .................. 56/10.1, 56/10.6, 10.7, 10.9, 11.6, 11.9, 14.7
See application file for complete search history.

(56) References Cited

U.S. PATENT DOCUMENTS

| | | | | |
|---|---|---|---|---|
| 3,719,371 A * | 3/1973 | Musgrave | ............ | 280/124.135 |
| 4,301,881 A * | 11/1981 | Griffin | ....................... | 180/6.48 |
| 4,768,997 A * | 9/1988 | Page et al. | ..................... | 474/84 |
| 4,813,215 A * | 3/1989 | Chase et al. | ................... | 56/11.6 |
| 4,878,339 A * | 11/1989 | Marier et al. | .................. | 56/14.7 |
| 4,879,867 A * | 11/1989 | Wenzel | ........................ | 56/11.1 |
| 4,939,892 A * | 7/1990 | Kawasaki | .................... | 56/11.1 |
| 4,991,382 A * | 2/1991 | Scag | ............................ | 56/10.9 |
| 5,077,959 A * | 1/1992 | Wenzel | ........................ | 56/11.1 |
| 5,127,215 A * | 7/1992 | Wenzel | ........................ | 56/11.1 |
| 5,518,079 A * | 5/1996 | Zvolanek | .................... | 180/19.1 |
| 5,797,251 A * | 8/1998 | Busboom | ..................... | 56/11.3 |
| 5,809,755 A * | 9/1998 | Velke et al. | ................... | 56/10.8 |
| 5,809,756 A * | 9/1998 | Scag et al. | ..................... | 56/10.8 |
| 5,816,034 A * | 10/1998 | Peter | ........................... | 56/11.4 |
| 5,832,703 A * | 11/1998 | Evans | ......................... | 56/11.4 |
| 5,848,520 A * | 12/1998 | Arfstrom et al. | ............. | 56/11.4 |
| 5,865,020 A * | 2/1999 | Busboom et al. | ........... | 56/320.1 |
| 5,915,487 A * | 6/1999 | Splittstoesser et al. | ...... | 180/19.1 |
| 5,984,031 A | 11/1999 | Velke et al. | | |
| 6,085,504 A | 7/2000 | Wright et al. | | |
| 6,155,033 A * | 12/2000 | Wians et al. | .................. | 56/11.1 |
| 6,434,917 B1 | 8/2002 | Bartel | | |
| 6,442,917 B1 * | 9/2002 | Velke et al. | ................... | 56/14.7 |
| 6,499,282 B1 * | 12/2002 | Velke et al. | ................... | 56/14.7 |
| 6,560,952 B2 * | 5/2003 | Velke et al. | ................... | 56/14.7 |

(Continued)

*Primary Examiner*—Thomas B Will
*Assistant Examiner*—Joan D Misa
(74) *Attorney, Agent, or Firm*—Nixon & Vanderhye P.C.

(57) ABSTRACT

A self-propelled lawn mower includes at least one cutting blade, at least first and second drive wheels, and hydro pumps for controlling the drive wheels. At least first and second belts are used to drive the pumps and blade(s) of the cutter deck, respectively. In certain example embodiments of this invention, the belt(s) for driving the hydro pumps is/are provided at an elevation lower than a belt(s) for driving the blade(s) of the cutter deck. In certain example embodiments of this invention, this advantageously permits the center of gravity of the mower to be lowered by permitting the hydro pumps and/or engine of the mower to be positioned at a lower elevation. In certain example embodiments, one or both of the hydro pumps is/are mounted on a pump deck which is at an elevation lower than that of the engine deck where the engine is mounted.

30 Claims, 9 Drawing Sheets

U.S. PATENT DOCUMENTS

| | | | |
|---|---|---|---|
| 6,629,577 B1 * | 10/2003 | Abend et al. ................. | 180/367 |
| 6,640,526 B2 | 11/2003 | Velke et al. | |
| 6,658,831 B2 | 12/2003 | Velke et al. | |
| 6,688,089 B2 | 2/2004 | Velke et al. | |
| 6,755,264 B2 * | 6/2004 | Hasegawa et al. ............ | 180/6.2 |
| 6,848,532 B2 * | 2/2005 | Korthals ...................... | 180/367 |
| 6,874,593 B2 * | 4/2005 | Abend et al. ................. | 180/367 |
| 6,926,111 B1 * | 8/2005 | Irikura ....................... | 180/234 |
| 6,935,454 B1 * | 8/2005 | Hauser et al. ................ | 180/242 |
| 7,028,456 B2 * | 4/2006 | Thatcher et al. .............. | 56/15.6 |
| 7,059,433 B2 * | 6/2006 | Hasegawa et al. ............ | 180/6.2 |
| 7,503,161 B1 * | 3/2009 | Mizukawa et al. ........... | 56/14.7 |
| 2003/0015361 A1 * | 1/2003 | Bland ......................... | 180/68.1 |
| 2003/0213626 A1 * | 11/2003 | Hafendorfer ............... | 180/6.48 |
| 2003/0213639 A1 * | 11/2003 | Korthals ..................... | 180/336 |
| 2004/0026137 A1 * | 2/2004 | Hauser ....................... | 180/6.48 |
| 2007/0151222 A1 * | 7/2007 | Iida et al. ...................... | 56/157 |

* cited by examiner

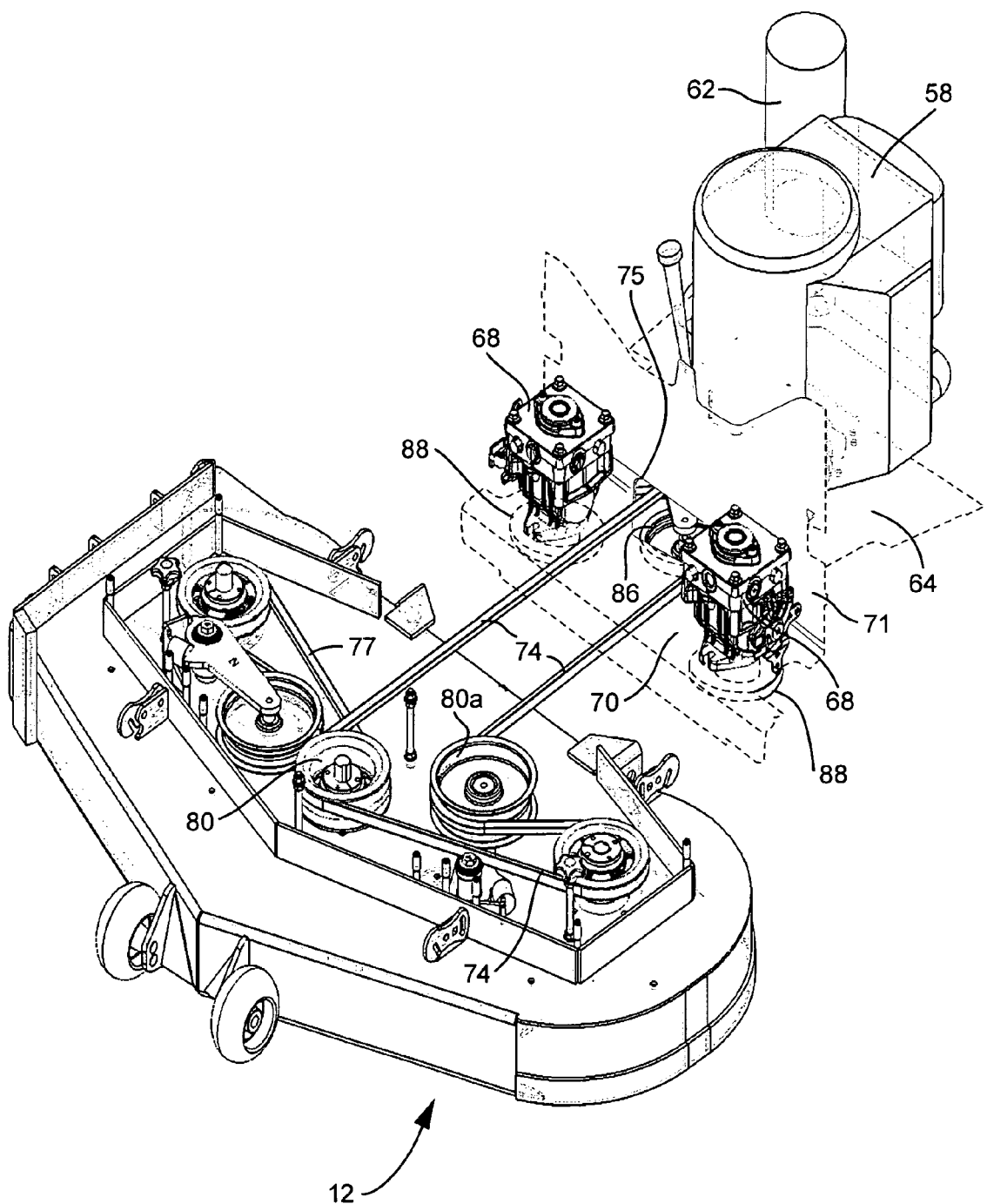
Fig. 8
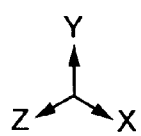

ively. In certain example embodiments, the belt(s) for driving
LAWN MOWER WITH BELT DRIVE SYSTEM This invention relates to self-propelled lawn mower including at least one cutting blade and at least first and second drive wheels (e.g., rear drive wheels). Hydro pumps are provided for controlling the drive wheels. At least first and second belts are used to drive the pumps and blade(s) of the cutter deck, respectively. In certain example embodiments of this invention, the belt(s) for driving the hydro pumps is provided at an elevation lower than a belt(s) for driving the blade(s) of the cutter deck. In certain example embodiments of this invention, this advantageously permits the center of gravity of the mower to be lowered by permitting the hydro pumps and/or engine of the mower to be positioned at a lower elevation.

BACKGROUND OF THE INVENTION

FIG. 1 is a perspective view of a known mower, typically referred to as a mid-mount Z type mower. The mid-mount Z mower of FIG. 1 includes a pair of rear drive wheels 43 each of which is driven by a hydro (hydrostatic or hydraulic) pump so that two pumps are provided, steering levers 15, 16, frame 17, cutter or mower deck assembly 12 below which the blades cut grass, operator seat 18 for a seated operator, gas tank 19, combustion engine 20 located behind the seat, and front caster wheels 37. The mower is a zero radius turning self-propelled power lawn mower, and includes first and second hydro pumps (not shown) for controlling first and second corresponding wheel motors (not shown), so that the first and second independently driven rear drive wheels 43 may be driven independently in order to conduct zero radius turns.

In the prior art type mower of FIG. 1, the combustion engine 20 has a shaft (not shown) which extends downwardly therefrom and drives pump and cutter deck belts (not shown). The hydro pumps (not shown) and the engine 20 are conventionally mounted on the same plane of the engine deck; with the hydro pumps being driven by an upper belt/pulleys and the cutting blades being driven by a lower belt/pulleys. Unfortunately, this results in a mower with a fairly high center of gravity, because both the engine 20 and the hydro pumps are mounted on the same plane and this common plane is at a fairly high elevation relative to the ground. Thus, this conventional mower suffers from a lack of traction on hillsides and from other problems which will be apparent to those skilled in the art which result from a high center of gravity.

BRIEF SUMMARY OF EXAMPLE EMBODIMENTS OF THE INVENTION

In certain example embodiments of this invention, a self-propelled lawn mower is provided so as to include at least one cutting blade and at least first and second drive wheels (e.g., rear drive wheels). Hydro pumps are provided for controlling the drive wheels. At least first and second belts are used to drive the hydro pumps and blade(s) of the cutter deck, respectively. In certain example embodiments, the belt(s) for driving the hydro pumps is provided at an elevation lower than a belt(s) for driving the blade(s) of the cutter deck. In certain example embodiments of this invention, this advantageously permits the center of gravity of the mower to be lowered by permitting the hydro pumps and/or engine of the mower to be positioned at a lower elevation so as to improve hill holding and other similar characteristics of the mower.

In certain example embodiments of this invention, there is provided a lawn mower comprising first and second drive wheels; a first pump for controlling the first drive wheel, and a second pump for controlling the second drive wheel, the first and second drive wheels being independently drivable via the pumps in both forward and reverse directions so as to permit zero radius turning of the mower; at least one cutting blade for cutting grass, the cutting blade being part of a cutter deck assembly; an engine mounted on an upper surface of an engine deck, the engine including an engine drive shaft extending downwardly from a bottom side thereof; at least one cutter deck drive belt for driving at least one cutting blade of the mower, the cutter deck drive belt being driven by the engine drive shaft and extending between the engine drive shaft and the cutter deck assembly; at least one pump belt for driving at least one of the first and second pumps, the pump belt also being driven by the engine drive shaft; wherein the cutter deck drive belt and the pump belt are operable to be positioned at substantially parallel different elevations during at least some mower operations, and wherein the cutter deck drive belt is located at an elevation above an elevation of the pump belt; and wherein the pumps are mounted on an upper surface of a pump deck, wherein the upper surface of the pump deck on which the pumps are mounted is at an elevation below the upper surface of the engine deck on which the engine is mounted.

In other example embodiments of this invention, there is provided a lawn mower comprising: first and second drive wheels; a first pump for controlling the first drive wheel, and a second pump for controlling the second drive wheel, the first and second drive wheels being independently drivable via the pumps in both forward and reverse directions so as to permit zero radius turning of the mower; at least one cutting blade for cutting grass, the cutting blade being part of a cutter deck assembly; an engine mounted on a surface of an engine deck, the engine including an engine drive shaft; at least one cutter deck drive belt for directly or indirectly driving at least one cutting blade of the mower, the cutter deck drive belt being driven directly or indirectly by the engine drive shaft, and the cutter deck drive belt extending between a rear area of the mower and the cutter deck assembly; at least one pump belt for driving at least one of the first and second pumps, the pump belt being driven directly or indirectly by the engine drive shaft; and wherein the cutter deck drive belt is located at an elevation above an elevation of the pump belt.

In still further example embodiments of this invention, there is provided a lawn mower comprising: first and second drive wheels; a first pump for controlling the first drive wheel, and a second pump for controlling the second drive wheel, the first and second drive wheels being independently drivable via the pumps, the first and second pumps being mounted on a surface of a pump deck; at least one cutting blade for cutting grass, the at least one cutting blade being part of a cutter deck assembly; an engine mounted on a surface of an engine deck, the engine including an engine drive shaft; the surface of the pump deck on which the pumps are mounted being at an elevation below an elevation of the surface of the engine deck on which the engine is mounted; at least one cutter deck drive belt for directly or indirectly driving the at least one cutting blade of the mower, the cutter deck drive belt being driven directly or indirectly by the engine drive shaft, and the cutter deck drive belt extending between a rear area of the mower and the cutter deck assembly; a substantially vertically extending wall located at least between the surface of the pump deck on which the pumps are mounted and the surface of the engine deck on which the engine is mounted, the substantially vertically extending wall having a hole defined therein, and wherein the cutter deck drive belt extends through the hole defined in the substantially vertically extending wall.

In further example embodiments of this invention, there is provided a lawn mower comprising: at least one drive wheel; at least one pump for controlling driving direction and speed of the drive wheel, at least one cutter deck drive belt for directly or indirectly driving at least one cutting blade of the mower, the cutter deck drive belt being driven directly or indirectly by an engine of the mower; at least one pump belt for driving at least the pump, the pump belt being driven directly or indirectly by the engine and being supported and driven by a pump drive engine pulley which rotates along with a shaft of the engine; and wherein a cutter deck engine pulley on which the cutter deck drive belt is mounted is located at an elevation above an elevation at which the pump drive engine pulley is located. In certain example embodiments, the pump drive engine pulley and the cutter deck engine pulley are coaxial and one or both of them are mounted on a drive shaft of the engine.

In yet additional example embodiments of this invention, there is provided a lawn mower comprising: at least one drive wheel; at least one pump for controlling the drive wheel; at least one cutting blade for cutting grass, the cutting blade being part of a cutter deck assembly; an engine mounted on a surface of an engine deck, the engine including an engine drive shaft; at least one cutter deck drive belt for directly or indirectly driving at least one cutting blade of the mower, the cutter deck drive belt being driven directly or indirectly by the engine drive shaft, and the cutter deck drive belt extending between a rear area of the mower and the cutter deck assembly; at least one pump belt for driving the pump, the pump belt being driven directly or indirectly by the engine drive shaft; and wherein the cutter deck drive belt is located at an elevation above an elevation of the pump belt.

BRIEF DESCRIPTION OF THE DRAWINGS

FIG. 8 is a perspective view of certain components of the mower including the cutter deck assembly, cutter deck pulleys, cutter deck drive belt, pumps and engine of the mower of FIGS. 2-7 (other parts are either omitted from or translucent in this figure for purposes of illustration and understanding).

DETAILED DESCRIPTION OF EXAMPLE EMBODIMENTS OF THE INVENTION

Figure 1:
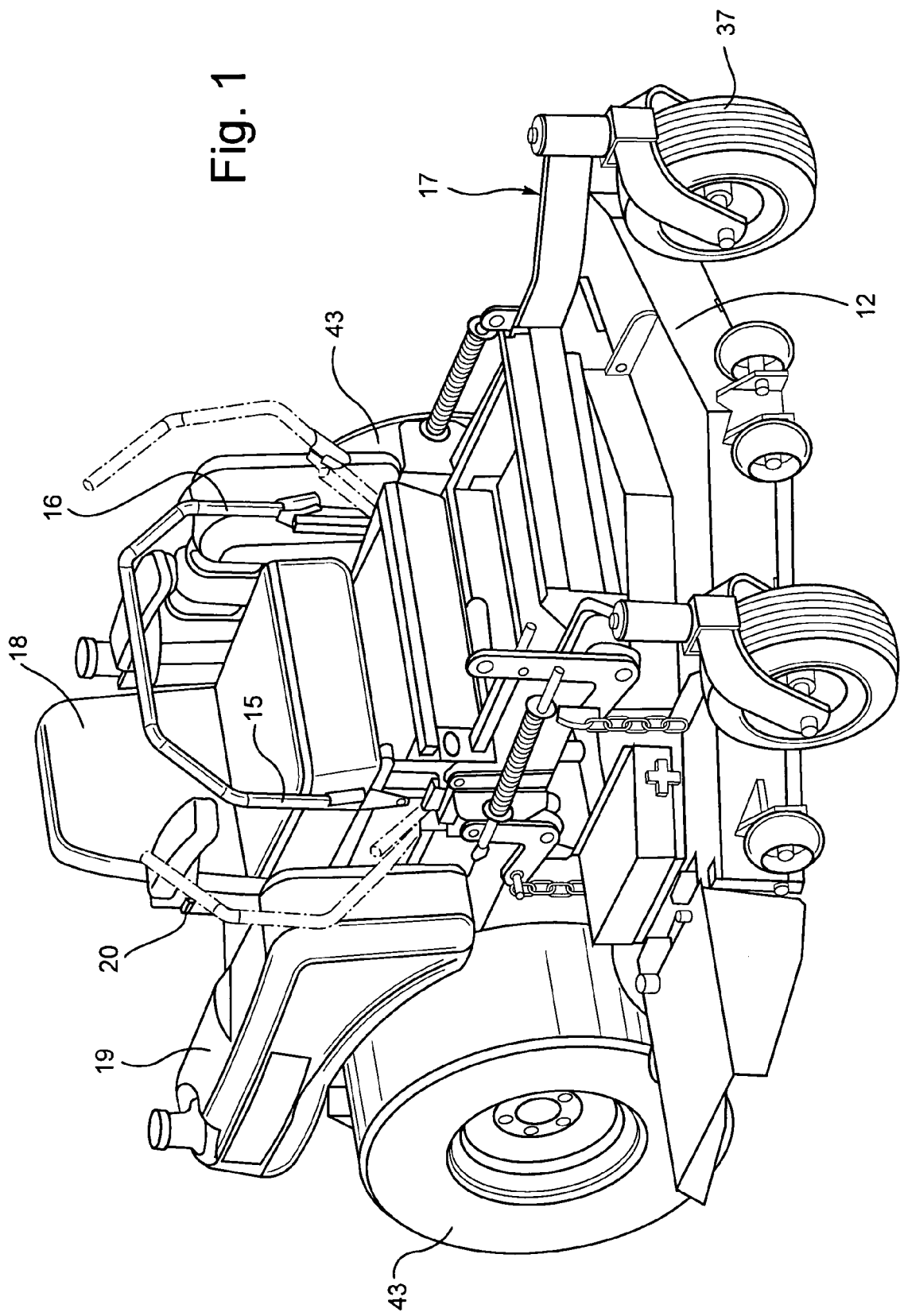
FIG. 1 is a perspective view of a conventional zero radius turning riding mower.

Referring now more particularly to the accompanying drawings in which like reference numerals indicate like parts throughout the several views.

Figure 2:
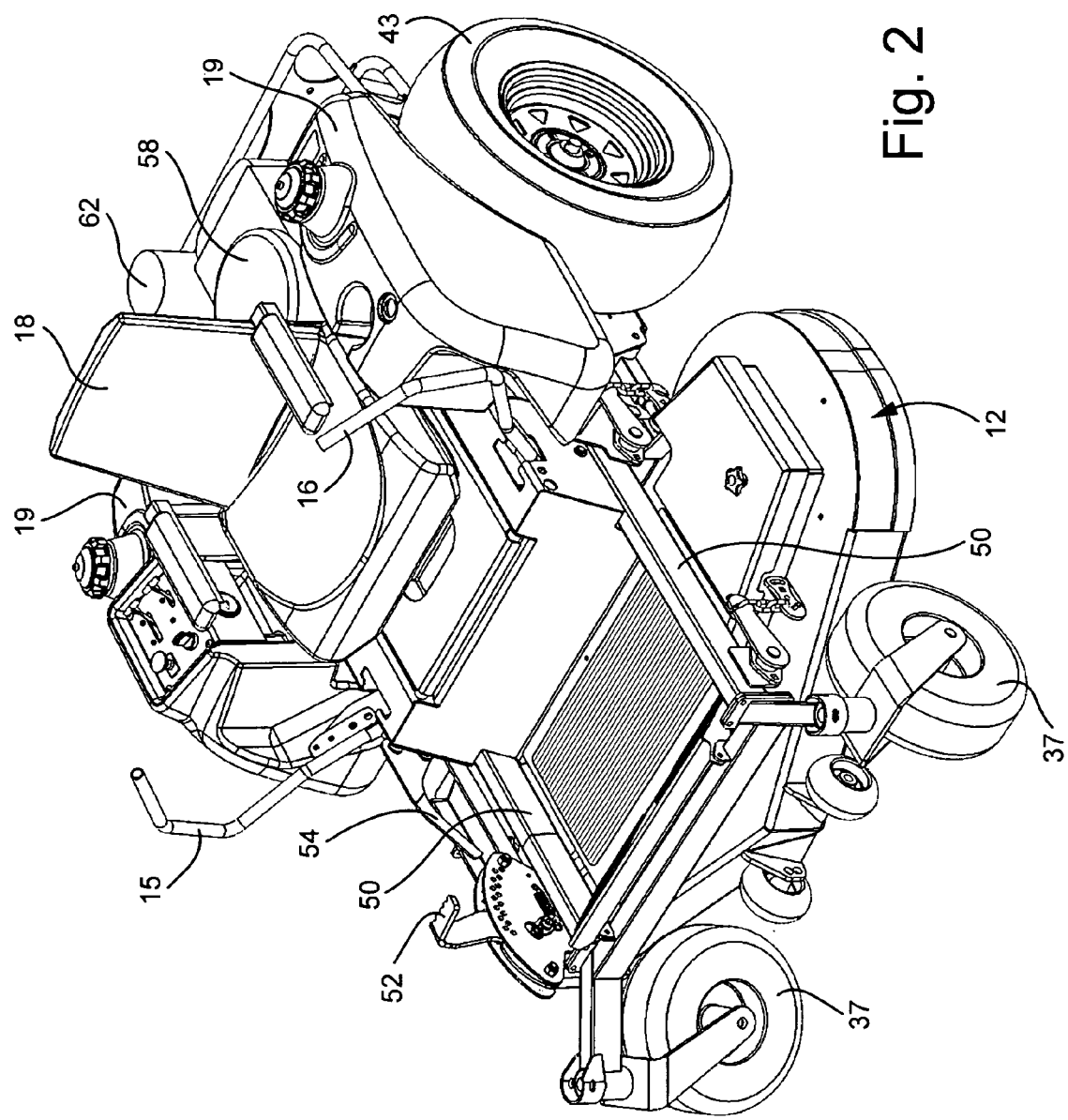
FIG. 2 is a perspective view of a zero radius turning lawn mower according to an example embodiment of this invention.
Figure 3:
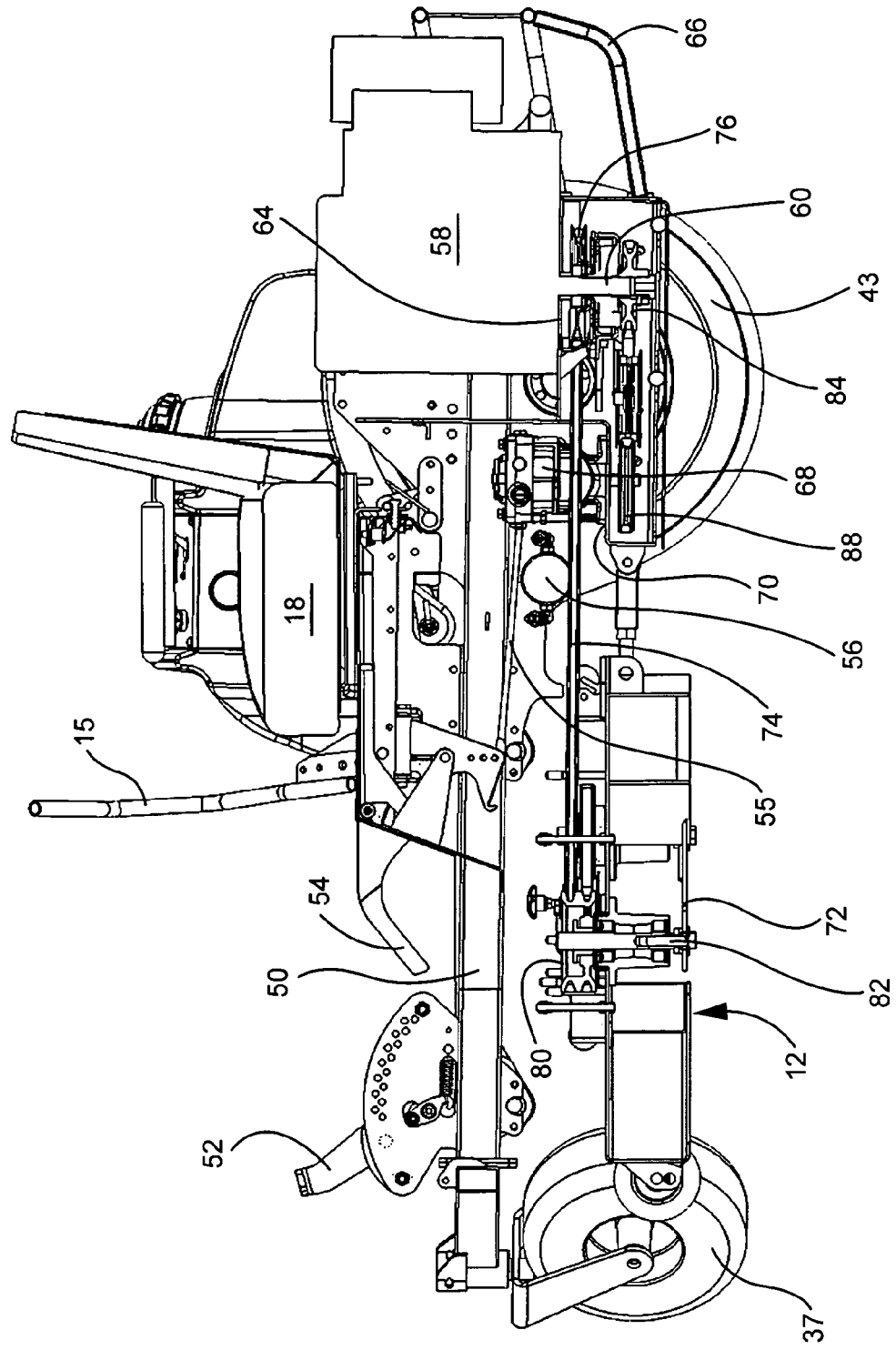
FIG. 3 is a side cross sectional view of the mower of FIG. 2.
Figure 4:
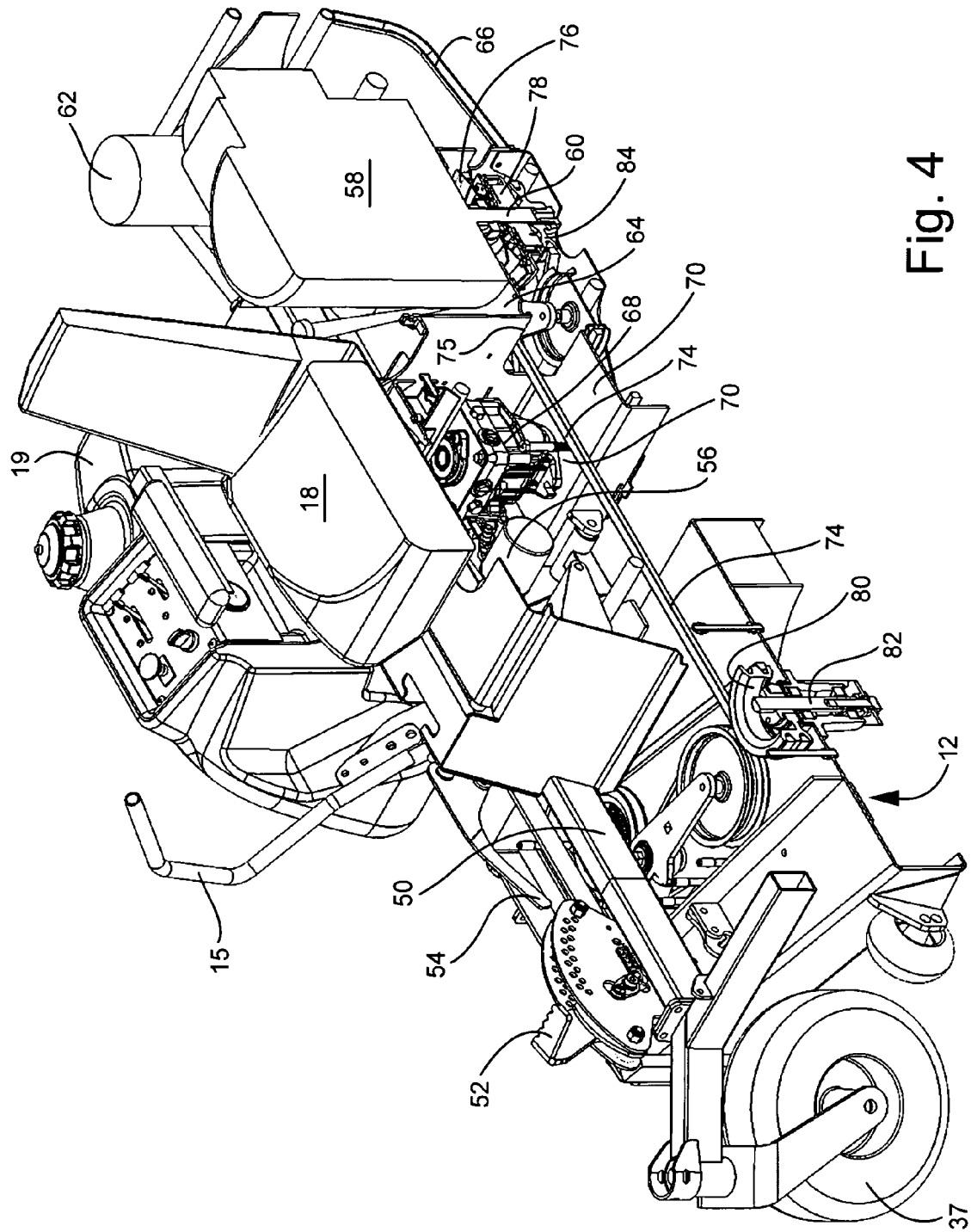
FIG. 4 is a split perspective view of the mower of FIGS. 2-3, showing the right half of the mower only, for purposes of illustration and understanding (the mower has been sliced down the middle in FIG. 4 so that only the right half of the mower is illustrated, and parts that have been sliced are shown cross sectionally).
Figure 5:
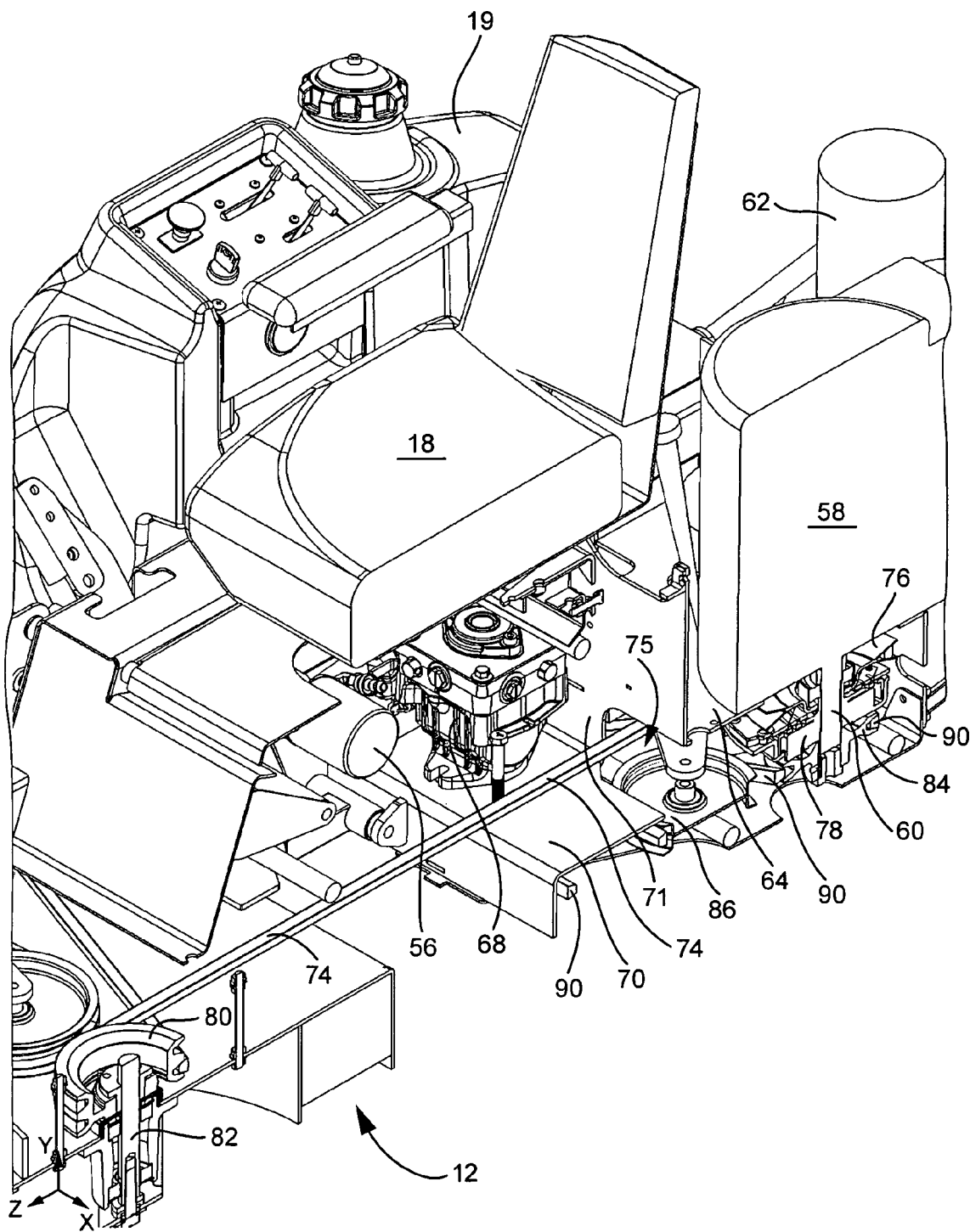
FIG. 5 is a close-up split perspective view of the mower of FIGS. 2-4, showing the right half of the mower only, for purposes of illustration and understanding (the mower has been sliced down the middle in FIGS. 4-5 so that only the right half of the mower is illustrated, and parts that have been sliced are shown cross sectionally).
Figure 6:
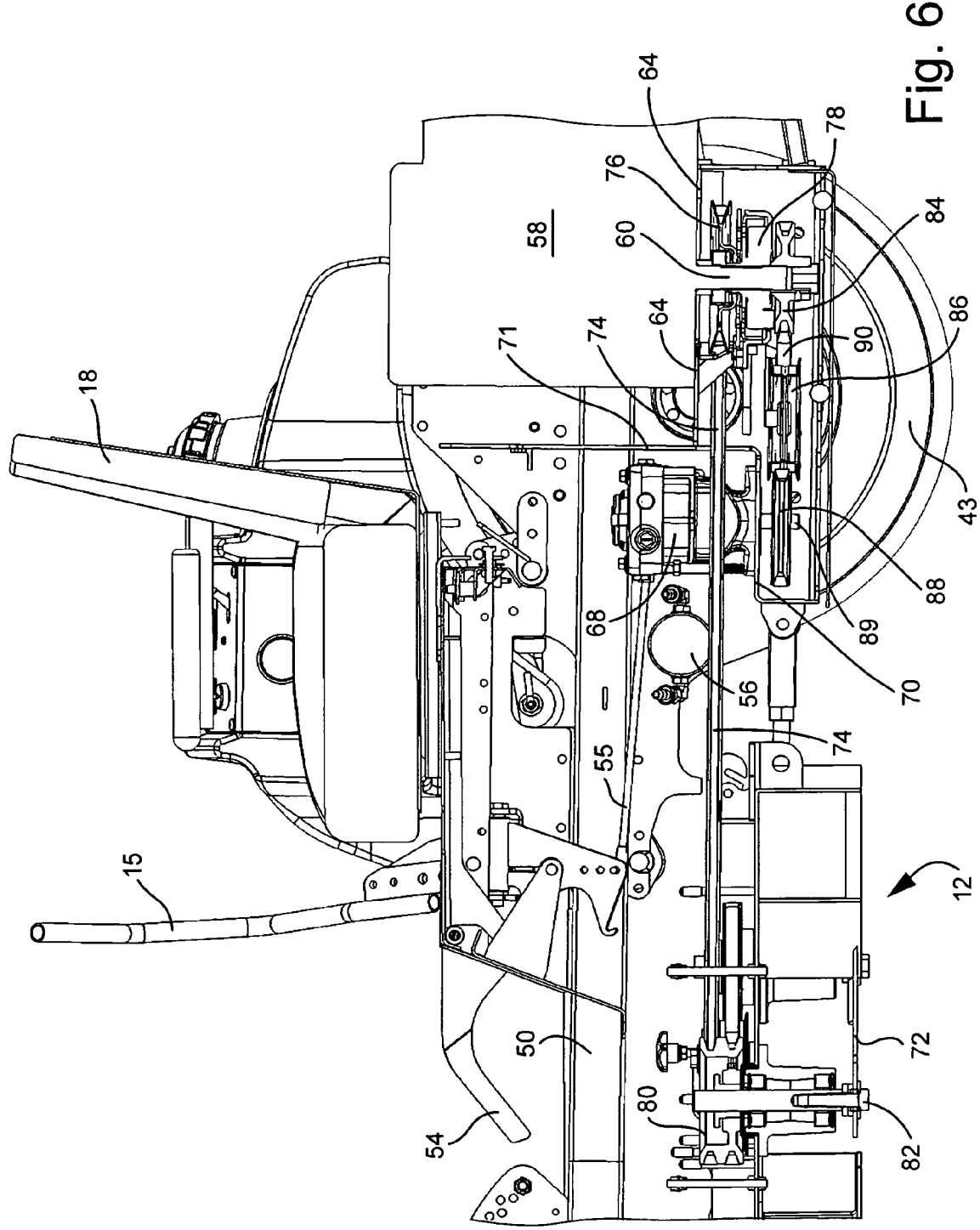
FIG. 6 is a close-up side cross sectional view of the mower of FIGS. 2-5, where the section line is taken where the slice is shown in FIGS. 4-5.
Figure 7:
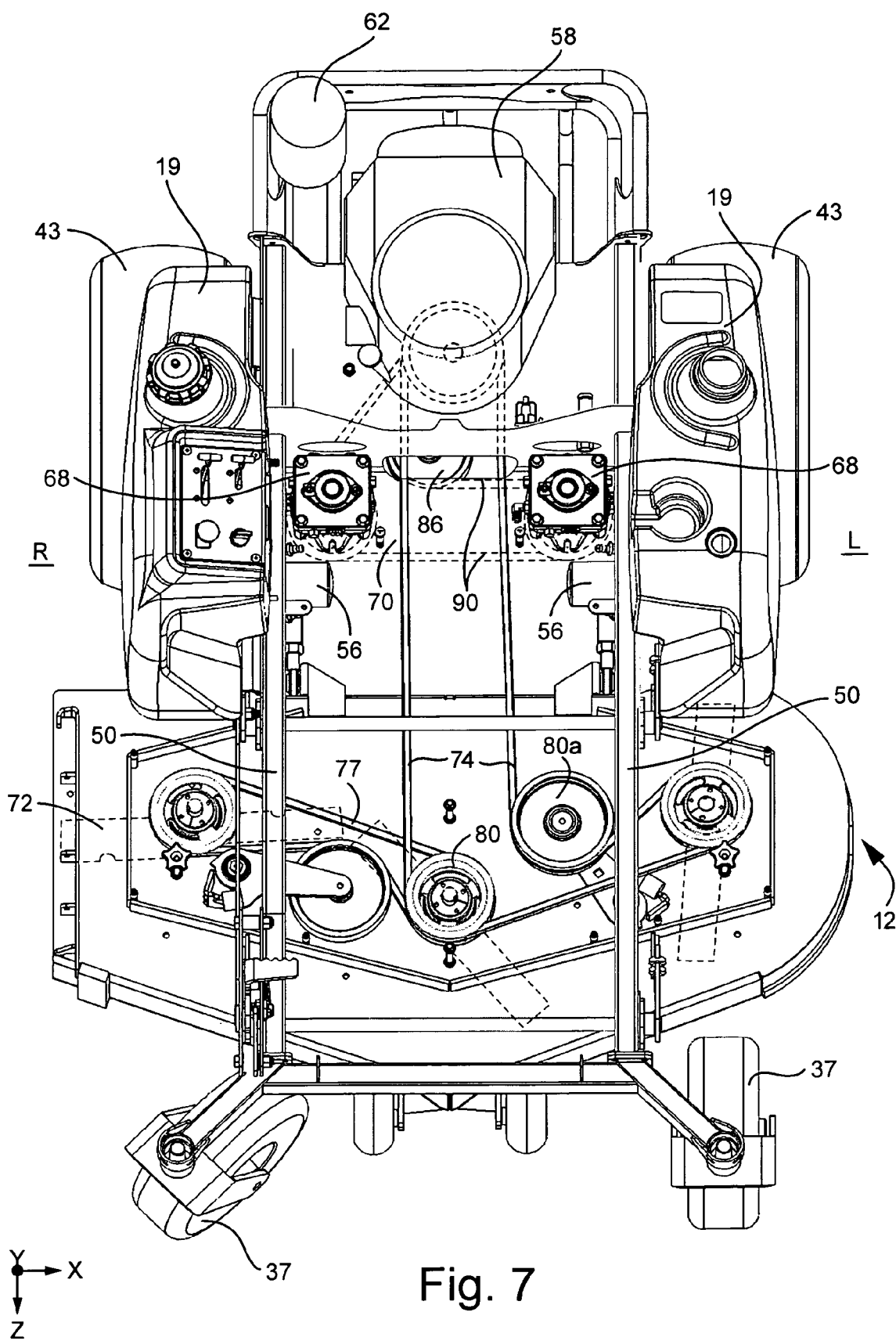
FIG. 7 is a top plan view of the mower of FIGS. 2-6, although certain components of the mower are either not shown or are translucent in this figure for purposes of illustration and understanding.
Figure 9:
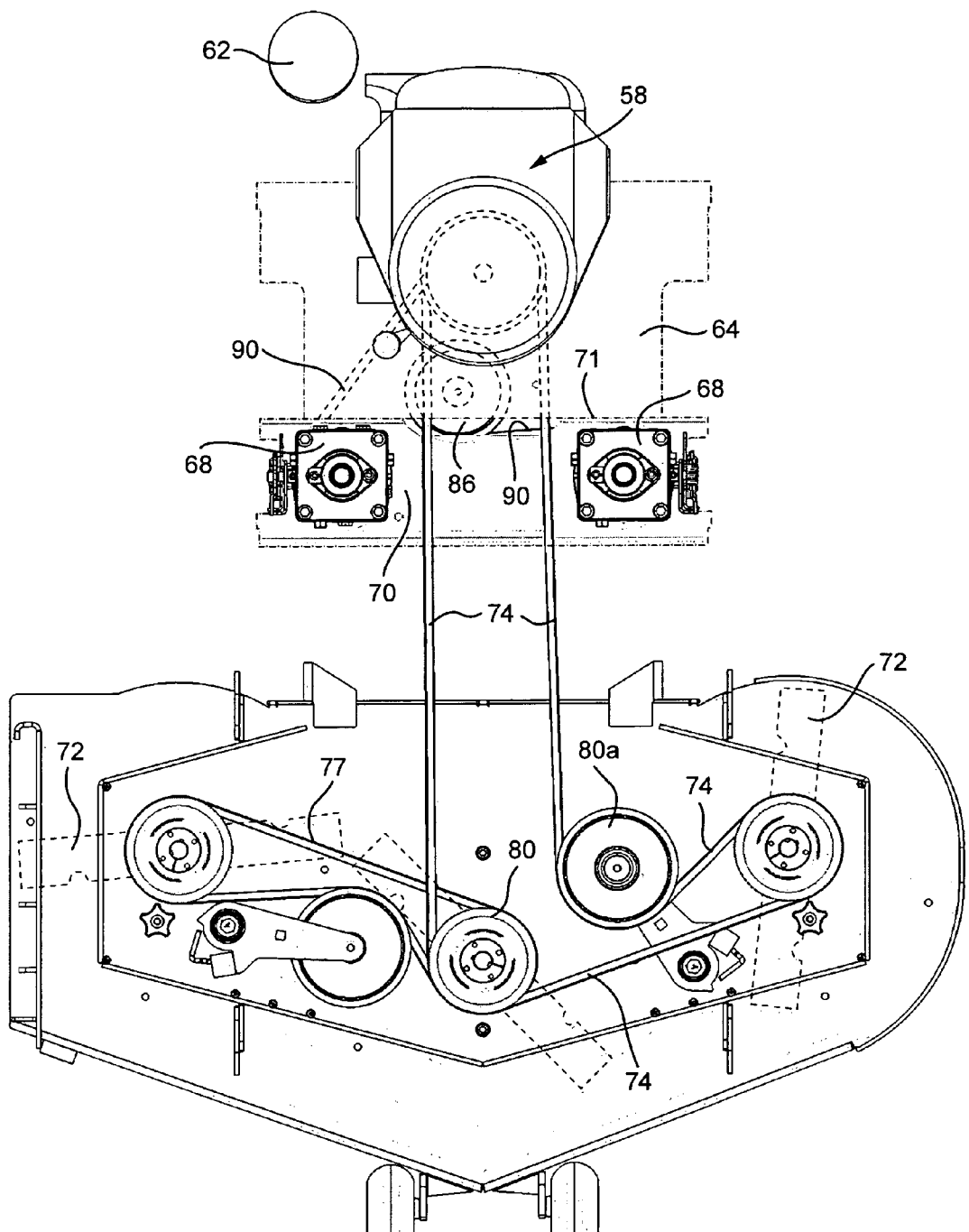
FIG. 9 is a top view of certain components of the mower including the cutter deck assembly, cutter deck pulleys, cutter deck drive belt, pumps and engine of the mower of FIGS. 2-8 (other parts are either omitted from or translucent in this figure for purposes of illustration and understanding).

FIGS. 2-9, for purposes of example only and without limitation, illustrate an example zero radius turning lawn mower according to an example embodiment of this invention. FIG. 2 is a perspective view of the mower; FIG. 3 is a side cross sectional view of the mower; FIGS. 4-5 are split perspective views of the mower showing the right half of the mower only for purposes of illustration and understanding only (the mower has been sliced down the middle in FIGS. 4-5 so that only the right half of the mower is illustrated, and parts that have been sliced are shown cross sectionally); FIG. 6 is a close-up side cross sectional view of the mower; FIG. 7 is a top plan view of the mower although certain components of the mower are either not shown or are translucent in this figure for purposes of illustration and understanding; FIG. 8 is a perspective view of certain components of the mower; and FIG. 9 is a top view of certain components of the mower.

Referring to FIGS. 2-9, the example mower is of the zero radius turning type and includes cutter deck assembly 12, steering or hand control levers 15, 16 for manipulation by the operator to steer the mower, seat 18 for supporting a sitting operator of the mower, fuel (e.g., gas) tank(s) 19 for holding fuel for the combustion engine, front caster wheels 37, rear drive wheels 43, tractor frame 50, deck lift foot pedal or lever 52 for raising/lowering the cutter deck assembly to adjust the cutting height of the mower or the like, brake lever 54 for applying a braking force to one or more of the rear drive wheels 43 of the mower, control rod 55, oil filter 56, combustion engine 58, engine drive shaft 60 which is driven by the engine 58 and extends downwardly from a bottom portion of the engine 58, muffler 62 for the engine, engine deck 64 upon which the engine 58 is mounted, engine guard 66 for guarding the engine, first and second hydro (hydrostatic or hydraulic) pumps 68 which control the drive speed and direction of the first and second drive wheels 43, respectively, pump deck 70 on which the pumps 68 are mounted, cross wall 71 which is substantially vertical (e.g., vertical plus/minus about 20 degrees) and which extends between at least the pump deck 70 and the engine deck 64, cutting blade(s) 72 provided in the cutter deck assembly 12 for cutting grass, cutter deck drive belt 74 which is driven by the engine 58 and extends between the engine drive shaft 60 and the cutter deck assembly 12, at least one aperture 75 defined in the cross wall 71 through which first and/or second substantially parallel portions of the cutter deck drive belt 74 are fed and move during mower operation, cutter deck engine pulley 76 operatively connected to the engine shaft 60 for rotation therewith and on which the cutter deck drive belt 74 is mounted, electromagnetic clutch/brake 78 operatively connected to the engine shaft 60 for clutching/braking the cutter deck engine pulley 76 and cutter deck drive belt 74 so as to permit the cutter deck drive belt 74 to be selectively actuated by the operator when the engine is running, blade pulley 80 mounted in the cutter deck which supports the end of the cutter deck drive belt 74 opposite the end supported by the pulley 76, additional pulley 80a also driven by the front portion of belt 74, and blade spindle 82 which rotates along with the pulley 76 and permits the belt 74 to drive the cutting blade(s) of the mower. As explained above, in certain example embodiments cross wall 71 is substantially vertical and extends between at least the pump deck 70 and the engine deck 64; however it is possible that wall 71 need not be substantially vertically oriented (e.g., it may be from about 40-70 degrees from vertical) in alternative embodiments of this invention.

Pump belt drive system includes pump drive engine pulley 84 mounted on the engine shaft 60 for rotation therewith, pump drive idler pulley 86, a pump pulley 88 mounted beneath each pump 68 and which rotates with the drive shaft 89 of each corresponding pump, and a pump drive belt 90 which is driven by the engine shaft 60 and which is mounted on each of pulleys 84, 86 and 88. In certain example embodiments, the pulleys 84, 86 and 88 are all substantially in a common plane which is below a plane of the pump deck and which is below a plane of the belt 74. In certain example embodiments, idler pulley 86 is provided on a swinging idler arm and is spring biased to maintain pump belt tension. A single pump belt 90 drives both pumps (via pulleys 84, 86, 88) in certain example embodiments of this invention (such as in the figures); however, in alternative embodiments of this invention one or more additional pump belt(s) may be provided.

In certain example embodiments of this invention, components such as the tractor frame 50, pump deck 70, engine deck 64 and cutter deck are made of sheet metal. However, it is possible that other materials may instead be used to fabricate these components.

In certain example embodiments, the mower is a riding mower, and the seat 18 of the mower is positioned laterally forward of at least part of the engine 58. However, in alternative embodiments of this invention the mower may be operated by a standing operator or the like and seat 18 may or may not be provided. While this invention may be implemented on a mid-mount Z type mower in certain example embodiments of this invention, this invention is not so limited and may also be implemented on other types of mowers.

As perhaps best shown in FIGS. 4, 7, 8 and 9, the mower may include first 74 and second 77 cutter deck drive belts both being located at elevation(s) or in plane(s) above the pump belt 90. In FIGS. 7-9, it can be seen that both cutter deck drive belts 74, 77 are mounted on pulley 80 but at slightly different elevations, so that pulley 80 allows drive from the engine to be transferred to belt 77 via belt 74. Each belt 74, 77 may drive different cutting blade(s) of the mower. Other belts may be provided in alternative embodiments of this invention; and only a single belt may be provided in still further alternative embodiments of this invention.

In certain example embodiments, the height of the cutter deck assembly 12 and thus the cutting height of the mower is adjustable. In certain example embodiments, the cutter deck assembly 12 moves upwardly and downwardly to adjust a cutting height of the mower and is not fixedly connected to the engine deck, so that the engine deck does not move upwardly and downwardly along with the cutter deck assembly.

In certain example embodiments of this invention, the lawn mower includes first and second drive wheels 43, a first pump 68 for controlling the speed and direction of the first drive wheel (via a non-shown wheel motor), a second pump 68 for controlling the speed and direction of the second drive wheel (via a non-shown wheel motor), the first and second drive wheels 43 being independently drivable via the pumps 68 in both forward and reverse directions so as to permit zero radius turning of the mower. The steering control levers 15, 16 are connected independently to the swash plate of its controlled pump 68 so as to permit the operator to cause variable speeds in forward, reverse and neutral for each drive wheel 43.

As shown in the figures, the engine 58 includes an engine drive shaft 60 extending downwardly, or in any other suitable direction, from a bottom or other side of the engine. The cutter deck drive belt 74 for driving at least one cutting blade of the mower, directly or indirectly, is driven by the engine drive shaft 60 via cutter deck engine pulley 76 and extends between the engine drive shaft 60 at a rear portion of the mower and the cutter deck assembly 12 at a front or mid portion of the mower. The pump belt 90 for driving at least one of the first and second pumps 68 is also driven by the engine drive shaft 60 via pump drive engine pulley 84. While the pump belt 90 drives both pumps 68 in the illustrated example embodiment, it is possible that first and second different pump belts may be provided for driving the first and second pumps, respectively, in alternatively example embodiments of this invention.

The cutter deck drive belt 74 and the pump belt 90 are operable to be positioned substantially parallel (parallel plus/minus about 20 degrees) to one another when viewed from the side, and thus at substantially parallel different elevations, during at least some mower operations. As shown in the figures, the cutter deck drive belt 74 is located at an elevation above an elevation of the pump belt 90. It will be appreciated that the cutter deck drive belt 74 may tilt when the cutter deck assembly 12 is moved upward/downward in order to adjust the height of the mower, but most if not all of the belt 74 is still located at an elevation above that of the pump belt in certain example embodiments of this invention. In this respect, the pumps 68 are mounted on an upper surface of pump deck 70, and the upper surface of the pump deck 70 on which the pumps are mounted is at an elevation below the upper surface of the engine deck 64 on which the engine 58 is mounted. In certain example instances, this may call for the engine shaft 60 being slightly longer than normal. These surfaces of the pump and engine decks are substantially parallel to one another in certain example embodiments of this invention, although this need not be the case in alternative embodiments. In certain example embodiments of this invention, the positioning of the pump belt below that of the cutter deck drive belt permits the engine and/or pumps to be lowered so as to be closer to the ground, which is advantageous in that it permits the center of gravity of the mower to be lowered by permitting the hydro pumps and/or engine of the mower to be positioned at a lower elevation so as to improve hill holding and other similar characteristics of the mower. In certain example non-limiting instances, the positioning of the belts and pulleys discussed herein has permitted the applicant to lower the engine from about two to three inches and to lower the pumps from about five to six inches which has significantly lowered the center of gravity of the mower and provided for a significantly better overall product.

As perhaps best shown in FIGS. 7-9, the pumps 68 are spaced apart from one another on the pump deck 70 with a space provided therebetween, so that the first pump is closer to a right side R of the mower and the second pump is closer to a left side L of the mower. The cutter deck drive belt 74 extends through the space between the pumps 68 (as viewed from above as in FIGS. 7-9) and is thus located at an elevation common with at least part of each of the pumps (as viewed from the side). Further in this respect, the substantially vertically extending cross wall 71 is located between a rear end of the upper surface of the pump deck 70 and a front end of the upper surface of the engine deck 64, and has a hole(s) 75 defined therein, and the cutter deck drive belt 74 extends through the hole 75 defined in the substantially vertically extending wall 71 thereby permitting the belt 74 to be located higher on the mower. These features are advantageous in that they permit an efficient path for the belt 74, and allow the belt 74 to be positioned above the pump belt 90 which is helpful to lower the center of gravity of the mower.

While two pumps 68 are used in the illustrated embodiments of this invention, this invention is not so limited. It is possible that only one pump 68 may be used to drive one or more drive wheels 43 in certain alternative example embodiments of this invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A lawn mower comprising:
   first and second drive wheels;
   a first pump for controlling the first drive wheel, and a second pump for controlling the second drive wheel, the first and second drive wheels being independently drivable via the pumps in both forward and reverse directions so as to permit zero radius turning of the mower;
   at least one cutting blade for cutting grass, the cutting blade being part of a cutter deck assembly;
   an engine mounted on an upper surface of an engine deck, the engine including an engine drive shaft extending downwardly from a bottom side thereof;
   at least one cutter deck drive belt supported by a plurality of cutting blade drive belt pulleys for driving at least one cutting blade of the mower, the cutter deck drive belt being driven by the engine drive shaft and extending between the engine drive shaft and the cutter deck assembly;
   at least one pump belt for driving at least one of the first and second pumps, the pump belt also being driven by the engine drive shaft;
   wherein the cutter deck drive belt and the pump belt are operable to be positioned at different substantially parallel elevations during at least some mower operations, and wherein the cutter deck drive belt is located at an elevation above an elevation of the pump belt;
   wherein all the cutting blade drive belt pulleys of the mower are located at an elevation above the elevation of the pump belt; and
   wherein the pumps are mounted on an upper surface of a pump deck, wherein the upper surface of the pump deck on which the pumps are mounted is at an elevation below the upper surface of the engine deck on which the engine is mounted.

2. The mower of claim 1, wherein the pumps are spaced apart from one another on the pump deck with a space provided therebetween, the first pump being closer to a right side of the mower and the second pump being closer to a left side of the mower, and wherein the cutter deck drive belt extends through the space between the pumps and is thus located at an elevation common with at least part of each of the pumps.

3. The mower of claim 1, wherein the mower is a riding mower, and wherein a seat of the mower is positioned laterally forward of at least part of the engine.

4. The mower of claim 1, further comprising a clutch located operably between the engine drive shaft and the cutter deck drive belt.

5. The mower of claim 1, wherein the pump belt drives each of the first and second pumps.

6. The mower of claim 1, further comprising a substantially vertically extending wall located between a rear end of the upper surface of the pump deck and a front end of the upper surface of the engine deck.

7. The mower of claim 6, wherein the substantially vertically extending wall has a hole defined therein, and wherein the cutter deck drive belt extends through the hole defined in the substantially vertically extending wall.

8. The mower of claim 1, wherein the first and second drive wheels are rear wheels of the mower.

9. The mower of claim 1, wherein the pumps are hydro pumps.

10. The mower of claim 1, wherein a seat of the mower is at least partially located laterally forward of both the engine and the pumps.

11. The mower of claim 1, wherein a height of the cutter deck assembly is adjustable, and wherein the cutter deck assembly moves upwardly and downwardly to adjust a cutting height of the mower and is not fixedly connected to the engine deck, so that the engine deck does not move upwardly and downwardly along with the cutter deck assembly.

12. The mower of claim 1, wherein a pump drive system of the mower comprises the pump belt, a first pulley attached to the engine shaft for rotation therewith, a second pulley operably connected to a shaft of one of the pumps, a third pulley operably connected to a shaft of the other one of the pumps, and an idler pulley, wherein the pump belt is mounted on each of the first, second, third and idler pulleys.

13. The mower of claim 12, wherein the first, second, third and idler pulleys are all substantially in a common plane which is below a plane of the pump deck.

14. A lawn mower comprising:
   first and second rear drive wheels;
   a first pump for controlling the first drive wheel, and a second pump for controlling the second drive wheel, the first and second drive wheels being independently drivable via the pumps in both forward and reverse directions so as to permit zero radius turning of the mower;
   a rotational axis about which the rear drive wheels rotate;
   at least one cutting blade for cutting grass, the cutting blade being part of a cutter deck assembly;
   an engine mounted on a surface of an engine deck, the engine including an engine drive shaft;
   at least one cutter deck drive belt for directly or indirectly driving at least one cutting blade of the mower, the cutter deck drive belt being driven directly or indirectly by the engine drive shaft, and the cutter deck drive belt extending between a rear area of the mower and the cutter deck assembly;
   at least one pump belt for driving at least one of the first and second pumps, the pump belt being driven directly or indirectly by the engine drive shaft;
   wherein the cutter deck drive belt is located at an elevation above an elevation of the pump belt; and
   wherein said rotational axis about which the rear drive wheels rotate is located at an elevation above the elevation of the pump belt.

15. The mower of claim 14, wherein the pumps are mounted on a surface of a pump deck, wherein the surface of the pump deck on which the pumps are mounted is at an elevation below the surface of the engine deck on which the engine is mounted.

16. The mower of claim 14, wherein the pumps are spaced apart from one another on a pump deck with a space provided therebetween, the first pump being closer to a right side of the mower and the second pump being closer to a left side of the mower, and wherein the cutter deck drive belt extends through the space between the pumps and is thus located at an elevation common with at least part of each of the pumps.

17. The mower of claim 14, wherein the mower is a riding mower, and wherein a seat of the mower is positioned laterally forward of at least part of the engine.

18. The mower of claim 14, wherein the mower comprises first and second cutter deck drive belts both being located at elevation(s) or in plane(s) above the pump belt.

19. The mower of claim 14, further comprising a substantially vertically extending wall located between a rear end of the surface of the pump deck on which the pumps are mounted and a front end of the surface of the engine deck on which the engine is mounted, the substantially vertically extending wall having a hole defined therein, and wherein the cutter deck drive belt extends through the hole defined in the substantially vertically extending wall.

20. The mower of claim 14, wherein the pumps are hydro pumps.

21. The mower of claim 14, wherein a seat of the mower is at least partially located laterally forward of both the engine and the pumps.

22. The mower of claim 14, wherein a pump drive system of the mower comprises the pump belt, a first pulley attached to the engine shaft for rotation therewith, a second pulley operably connected to a shaft of one of the pumps, a third pulley operably connected to a shaft of the other one of the pumps, and an idler pulley, wherein the pump belt is mounted on each of the first, second, third and idler pulleys, and wherein the first, second, and third pulleys are all substantially in a common plane which is below a plane of the pump deck.

23. A lawn mower comprising:
 first and second drive wheels;
 a first pump for controlling the first drive wheel, and a second pump for controlling the second drive wheel, the first and second drive wheels being independently drivable via the pumps, the first and second pumps being mounted on a surface of a pump deck;
 at least one cutting blade for cutting grass, the at least one cutting blade being part of a cutter deck assembly;
 an engine mounted on a surface of an engine deck, the engine including an engine drive shaft;
 the surface of the pump deck on which the pumps are mounted being at an elevation below an elevation of the surface of the engine deck on which the engine is mounted;
 at least one cutter deck drive belt for directly or indirectly driving the at least one cutting blade of the mower, the cutter deck drive belt being driven directly or indirectly by the engine drive shaft, and the cutter deck drive belt extending between a rear area of the mower and the cutter deck assembly;
 a substantially vertically extending wall located at least between the surface of the pump deck on which the pumps are mounted and the surface of the engine deck on which the engine is mounted, the substantially vertically extending wall having a hole defined therein, and wherein the cutter deck drive belt extends through the hole defined in the substantially vertically extending wall; and
 wherein all cutter deck drive belts of the mower are located at an elevation above an elevation of the pump belt.

24. The mower of claim 23, further comprising at least one pump belt for driving at least one of the first and second pumps, the pump belt being driven directly or indirectly by the engine drive shaft.

25. The mower of claim 23, wherein the pumps are spaced apart from one another on the pump deck with a space provided therebetween, and wherein the cutter deck drive belt extends through the space between the pumps.

26. The mower of claim 23, wherein a pump drive system of the mower comprises a pump belt, a first pulley attached to the engine drive shaft for rotation therewith, a second pulley operably connected to a shaft of one of the pumps, a third pulley operably connected to a shaft of the other one of the pumps, and an idler pulley, wherein the pump belt is mounted on each of the first, second, third and idler pulleys, and wherein at least the first, second, and third pulleys are all substantially in a common plane which is below a plane of the pump deck.

27. A lawn mower comprising:
 at least one drive wheel;
 at least one pump for controlling driving direction and speed of the drive wheel;
 at least one cutter deck drive belt supported by a plurality of cutting blade drive belt pulleys for directly or indirectly driving at least one cutting blade of the mower, the cutter deck drive belt being driven directly or indirectly by an engine of the mower;
 at least one pump belt for driving at least the pump, the pump belt being driven directly or indirectly by the engine and being supported and driven by a pump drive engine pulley which rotates along with a shaft of the engine;
 wherein a cutter deck engine pulley on which the cutter deck drive belt is mounted and located at an elevation above an elevation at which the pump drive engine pulley is located;
 wherein the pump for controlling driving direction and speed of the drive wheel is located at an elevation above the elevation at which the pump drive engine pulley is located; and
 wherein all the cutting blade drive belt pulleys of the mower are located at an elevation above the elevation of the pump belt.

28. The mower of claim 27, wherein the cutter deck engine pulley and the pump drive engine pulley are coaxial.

29. A lawn mower comprising:
 at least one drive wheel;
 at least one pump for controlling the drive wheel;
 at least one cutting blade for cutting grass, the cutting blade being part of a cutter deck assembly;
 an engine mounted on a surface of an engine deck, the engine including an engine drive shaft;
 at least one cutter deck drive belt supported by a plurality of cutting blade drive belt pulleys for directly or indirectly driving at least one cutting blade of the mower, the cutter deck drive belt being driven directly or indirectly by the engine drive shaft, and the cutter deck drive belt extending between a rear area of the mower and the cutter deck assembly;
 at least one pump belt for driving the pump, the pump belt being driven directly or indirectly by the engine drive shaft;
 wherein the cutter deck drive belt is located at an elevation above an elevation of the pump belt;
 wherein the pump for controlling the drive wheel is located at an elevation above the elevation of the pump belt; and
 wherein all the cutting blade drive belt pulleys of the mower are located at an elevation above the elevation of the pump belt.

30. The mower of claim 29, wherein the pump is mounted on a surface of a pump deck, wherein the surface of the pump deck on which the pump is mounted is at an elevation below the surface of the engine deck on which the engine is mounted.

\* \* \* \* \*